United States Patent
Lehfeldt

[11] 3,921,941
[45] Nov. 25, 1975

[54] AIRCRAFT RATE TRIM SYSTEM
[75] Inventor: James J. Lehfeldt, Olathe, Kans.
[73] Assignee: King Radio Corporation, Olathe, Kans.
[22] Filed: Aug. 23, 1973
[21] Appl. No.: 390,771

[52] U.S. Cl.......... 244/77 F; 73/178 R; 235/150.2; 244/77 D
[51] Int. Cl................................. B64c 13/18
[58] Field of Search ............... 73/178 R, 178 T; 235/150.2; 244/77 R, 77 D, 77 F, 77 A; 318/584; 340/27 R, 27 NA, 27 SS

[56] References Cited
UNITED STATES PATENTS
| | | | |
|---|---|---|---|
| 3,291,421 | 12/1966 | Kramer et al............. | 244/77 A |
| 3,641,323 | 2/1972 | Hughes et al............. | 244/77 D X |
| 3,743,221 | 7/1973 | Lykken et al............. | 244/77 D X |
| 3,744,309 | 7/1973 | Astengo ................... | 73/178 R |

Primary Examiner—Trygve M. Blix
Assistant Examiner—Stephen G. Kunin
Attorney, Agent, or Firm—Lowe, Kokjer, Kircher

[57] ABSTRACT

A method and apparatus are provided that enables a pilot of an aircraft to adjust, in a precise and smooth manner, various aircraft flight parameters while the aircraft is on a hold mode of an aircraft flight director or an autopilot flight control system. The preferred embodiment uses a signal input from a vertical gyro and an indicated air speed rate sensor to modify a trim rate command input to the autopilot or flight director, thereby enabling the aircraft to modify its air speed reference in the autopilot or flight director without disengagement of the flight control system.

7 Claims, 2 Drawing Figures

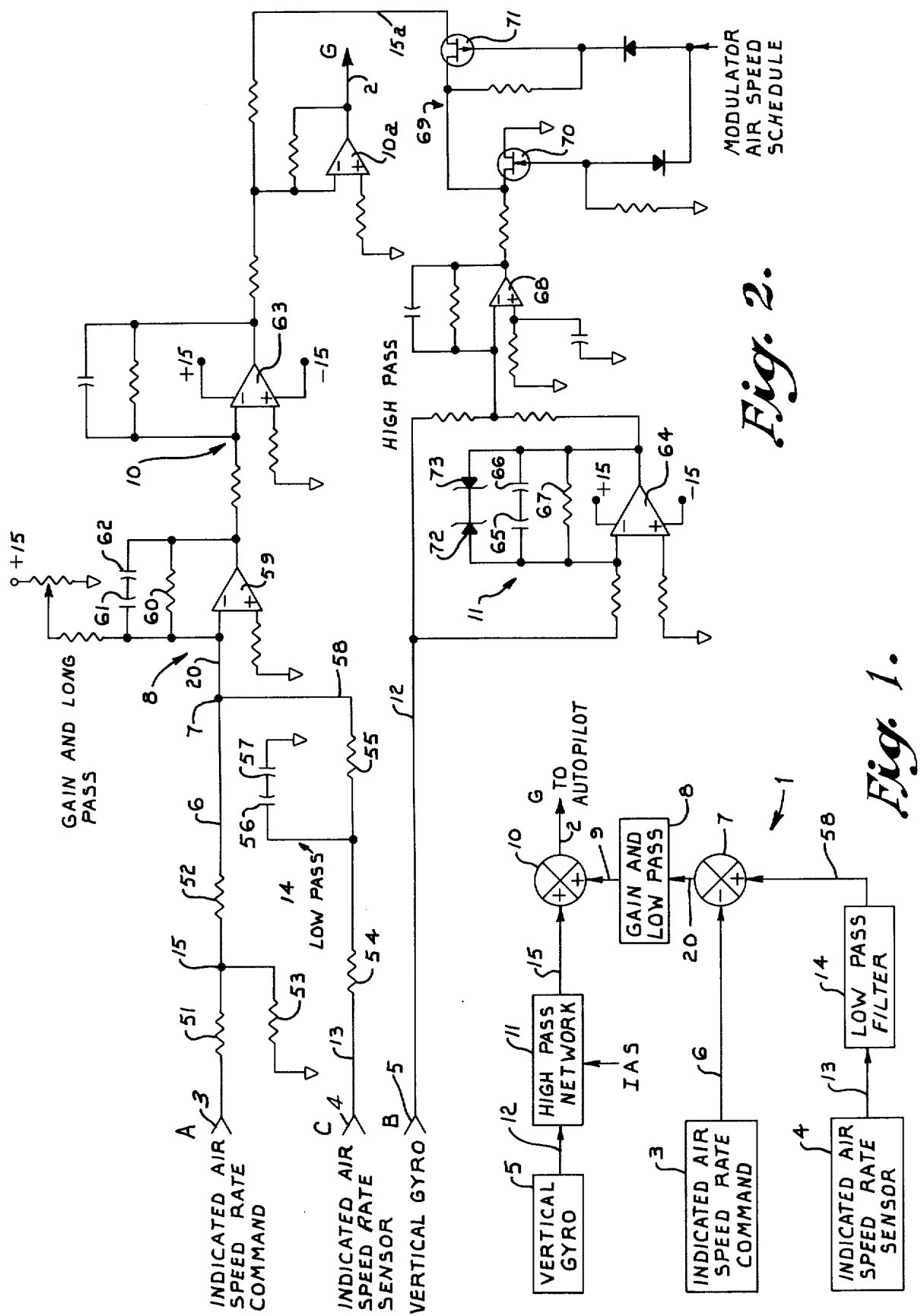

AIRCRAFT RATE TRIM SYSTEM

BACKGROUND AND BRIEF DESCRIPTION OF THE INVENTION

The subject invention relates to a method and apparatus for adjusting aircraft flight parameters while those aircraft flight parameters are under the control of a flight director or autopilot. The invention will be discussed in detail with respect to its use for an indicated air speed rate trim system, however, the same method and apparatus will function as an altitude rate trim system and similarly related avionics systems.

This invention has particular application in conjunction with autopilots and flight directors for business aircraft. Prior art trim systems, used in conjunction with autopilots or flight directors, required the disengagement of the air speed hold mode of the aircraft control system in order to change the air speed reference. For example, assume a situation where an aircraft is maintaining 150 kts under autopilot air speed hold and the aircraft pilot desires to change the air speed reference of the flight control system from the 150 kts to 140 kts. With prior art systems, the pilot is required to disengage the air speed hold mode and manually fly the aircraft to a new pitch altitude, thereby causing a reduction in air speed to 140 kts. At the 140 kt air speed, the air speed hold mode of the aircraft flight control system would be reengaged to hold the new reference air speed of 140 kts.

The invention disclosed hereinafter allows the pilot to modify or change the reference air speed in a precise manner without disengaging the air speed hold mode of the aircraft flight control system. The pilot can accomplish the air speed change by the simple actuation of an air speed trim switch. The activation of the air speed trim switch commands a fixed air speed rate change to the autopilot. The manual switch is released when the aircraft passes through the newly desired reference air speed. A typical application for this type of air speed change occurs in a programmed descent where a pilot would use various air speed rates to control the rate of descent to a new altitude. Small changes in the air speed reference would be used to obtain the desired rate of descent.

As indicated above, the method and apparatus of this invention also can function as an altitude rate trim system. When so used, the apparatus normally complements the altitude select-capture system such as the King Radio Altitude Capture System designed for use in conjunction with the invention which is disclosed and described in the co-pending Lehfeldt United States application entitled "METHOD AND APPARATUS FOR AUTOMATICALLY COMPUTING VERTICAL TRACK ANGLE", Ser. No. 387,209 filed Aug. 9, 1973. The altitude select-capture system normally transfers control of the aircraft to the flight director or autopilot at some altitude near but not exactly at the pilot selected altitude. In its altitude rate trim configuration, this invention allows the pilot to change the altitude reference so that the altitude hold reference of the flight control system is equal precisely to the pilot selected altitude and is designed to operate in the same manner as its indicated air speed rate trim configuration. A pilot may select an altitude (for example, 12,500 feet), on the aircraft altitude select system and the aircraft automatically will climb to some altitude slightly in excess of 12,500 (approximately 12,550 feet). At this time, the system will automatically switch to an altitude hold which will maintain aircraft position slightly above the desired selected altitude. The altitude rate trim system then is activated by engaging a manual switch on the pilot mode controller and the aircraft altitude will change at a fixed rate until the switch is released, and the pilot releases the altitude switch when the aircraft is at the desired altitude. Altitude trim may be accomplished without disengagement of the altitude hold mode before the altitude reference is changed and eliminates the need for a manual aircraft maneuver to the new altitude and reengagement of the altitude hold mode.

One of the objects of this invention is to provide a means for changing an aircraft flight parameter in a smooth and precise manner while the aircraft is being controlled by the flight director or autopilot.

Another object of this invention is to provide a unique means for altering flight parameters in conjunction with flight director or autopilot control of an aircraft. It is a feature of the invention that the flight director or autopilot need not be disengaged before the change in flight parameter is made.

Another object of this invention is to provide a simple, low cost device for changing aircraft flight parameters of an aircraft.

Still another object of this invention is to provide a device that reduces pilot work load by enabling a pilot to change the flight parameters of an aircraft easily and automatically.

These and other objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a block circuit diagram showing the unique circuit for providing aircraft parameter trim maneuver signals; and FIG. 2 is a more detailed schematic diagram of the circuit shown in FIG. 1.

Turning now more specifically to the drawing, the flight director or autopilot is not shown, however, it should be understood that the invention may be utilized with either and that the circuit as shown is described in its indicated air speed rate trim function. Of course, the circuit may alternately be used for altitude trim without altering the circuit configuration shown in FIG. 2. (Except the indicated air speed input to block 11 is used for the altitude trim system).

Referring now to FIG. 1, reference numeral 1 indicates the rate trim command system of this invention. The system 1 has an output to the autopilot (or flight director) shown as line 2 and has a plurality of inputs, including a rate command 3, a rate sensor 4, and a vertical gyro 5.

The rate command 3 may be a manually operated switch, not shown, generally contained on the pilot mode selection console which, when closed, permits generation of the input signal to the system 1, along the schematically shown line 6. The command signal is routed through a summer 7 and along line 20 to a gain and low pass filter 8. Thus filter 8 smooths the leading edge of the command signal input, and the signal passes, via a line 9, to a summer circuit 10. The output of summing means 10 appears along the line 2 and forms an input signal to the autopilot or flight director.

This initial signal command output at line 2 causes the aircraft to nose up or nose down in response to the signal. The vertical gyro 5 senses any attitude changes and generates an attitude change signal input to a high pass network 11, via line 12. High pass network 11 permits high frequency components of the attitude change signal input (corresponding to the changing attitude rate) to pass through the network 11, but very low frequency components (representing steady state attitude) are rejected.

As the aircraft continues to change position, the air speed rate sensor 4 also begins sensing any change in aircraft speed and it too generates an output signal in response to such change. The output indicated air speed rate signal from the rate sensor 4 forms an input to the command system 1, and in particular, to a low pass filter 14, along line 13. Low pass filter 14 attenuates the higher frequency noise and the initial portion of the sensed indicated air speed rate signal. Only slowly varying air speed rate signals are allowed to pass through the low pass filter 14 and from thence to summer 7, via line 58.

The signal appearing on line 15 comprises a dominant feedback term initially and becomes a small term after the steady state trim rate is achieved. Actually, this vertical gyro signal is the dominant signal for the first few seconds of the trim maneuver since it is a smooth and noise free signal. At the time, the signal generated from the rate sensor 4 provides only a long term reference signal since it is filtered with a long time constant.

It may thus be observed that the command system 1 may be utilized for either or both altitude and indicated air speed trim in conjunction with the autopilot and flight direction without the necessity of interrupting flight director or autopilot control of the aircraft.

Turning now to the more detailed circuit shown in FIG. 2, closing the pilot's manual switch on the pilot mode control causes a voltage developed over resistors 51, 52 and 53 to appear on node 15. This voltage first appears at line 6 and is inputted to the summer 7.

The rate sensor 4 provides an input along the conductor 13 to the low pass filter 14. Low pass filter 14 includes a resistor 54, a resistor 55 and a pair of series capacitors 56 and 57 as the reactive elements thereof. The output of the filter 14 is electrically connected to the summer 7 by the line 58 so that any signal present on the summer 7 is passed through the gain and low pass filters 8, same including an operational amplifier 59, a feedback resistor 60 and a pair of capacitors 61 and 62. Output of the amplifier 59 is inputted to the summer 10 through yet another operational amplifier identified by the numeral 63.

The vertical gyro signal input is made to the high pass network 11 via line 12. High pass network 11 includes an operational amplifier 64, a feedback resistor 67 and a pair of capacitors 65 and 66 which are arranged to permit feedback of high frequency components of the output signal from amplifier 64. A pair of zener diodes 72 and 73 are provided as limiters. The output of high pass network 11 forms an input for an amplifier 68 which, in turn, provides an input for a modulator 69.

Modulator 69 includes a pair of field effect transistors 70 and 71. The modulator 69 schedules pitch high pass gain with air speed and would be used in the altitude rate trim system. The output of modulator 69 is electrically connected to the summer 10 via the conductor 15a.

Summer node 11 combines the feedback signals corresponding to the composite indicated air speed rate and the vertical gyro signal. This combined signal is amplified at 10a to provide an output command signal to the autopilot or flight director shown in the output on line 2.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An aircraft trim system comprising:
    means for receiving an initiating command signal corresponding to indicated air speed rate;
    means for receiving a signal from a first sensor and attenuating high frequency signal components from said first sensor signal thereby yielding a first filtered signal;
    said first sensor signal corresponding to indicated air speed rate;
    means for receiving a signal from a second sensor and attenuating low frequency signal components from said second sensor thereby yielding a second filtered signal;
    said second sensor signal corresponding to the indicated pitch attitude of the aircraft;
    first means for summing said initiating command signal with said first filtered signal;
    means for shaping the output of said first summing means;
    second means for summing the output of said shaping means with said second filtered signal, said second summing means providing an output signal for controlling a device which effects the trimming of the aircraft.

2. The system of claim 1 wherein both said first sensor signal and its associated attenuating means and said second sensor signal and its associated attenuating means include a reactive element circuit, said first attenuating means having a long time constant in comparison to the time constant of said second attenuating means.

3. The system of claim 2 wherein said first summing means comprises an electrical connection node.

4. The system of claim 3 wherein said second summing means includes an operational amplifier.

5. A method for changing flight parameters of an aircraft under control of a flight control system, said method comprising the steps of:
    generating and initiating a command signal corresponding to indicated air speed rate, said command signal being operable to change a flight parameter;
    sensing a first flight parameter corresponding to indicated air speed rate and generating a first feedback signal representing change in said first parameter;

sensing a second flight parameter corresponding to the indicated pitch attitude of the aircraft and generating a second feedback signal representing changes in said second flight parameter;

low pass filtering said first feedback signal;

high pass filtering said second feedback signal;

combining said first and second signal with said initiating command signals to obtain a final command signal; and delivering said final command signal to apparatus for correcting aircraft trim.

6. The method as in claim 5 including the step of attenuating said first and second feedback signals with attenuating means having different time constants.

7. The method as in claim 6 wherein the step of attenuating said first feedback signal is performed with an attenuating means having a longer time constant than the attenuating means for said second feedback signal.

* * * * *